United States Patent [19]

Oh

[11] Patent Number: 4,749,207
[45] Date of Patent: Jun. 7, 1988

[54] HAND PROPELLED AND FOOT STEERED CART

[76] Inventor: Myung K. Oh, 9-85, Tuck Eun-Ri, Shin Do-Eup, Koyang-goon, Kyung Gi-Do, Rep. of Korea

[21] Appl. No.: 943,367

[22] Filed: Dec. 18, 1986

[30] Foreign Application Priority Data

Dec. 20, 1985 [KR] Rep. of Korea ............... 17183/85

[51] Int. Cl.$^4$ .............................................. B62M 1/14
[52] U.S. Cl. ................................... 280/247; 280/265; 280/282
[58] Field of Search ............ 280/200, 210, 230, 242 R, 280/244, 247, 253, 256, 265, 267, 269, 282; D12/112

[56] References Cited

U.S. PATENT DOCUMENTS

| D. 146543 | 4/1947 | Hecht | 280/269 |
| D. 280,980 | 10/1985 | Oh | D12/112 |
| 680,741 | 8/1901 | Starbuck | 280/265 |
| 3,149,857 | 9/1964 | May | 280/265 |
| 4,524,987 | 6/1985 | Kim | 280/204 |
| 4,639,007 | 1/1987 | Lawrence | 280/244 |

FOREIGN PATENT DOCUMENTS

| 598312 | 12/1925 | France | 280/247 |
| 634674 | 2/1928 | France | 280/244 |

Primary Examiner—John J. Love
Assistant Examiner—Everett G. Diederiks, Jr.
Attorney, Agent, or Firm—Spencer & Frank

[57] ABSTRACT

A non-motorized cart for carrying a rider who supplies propelling energy for the cart, including: a frame having an H-shaped form, a front end and a rear end; two front wheels and two rear wheels; a crank mechanism connected to the rear wheels for rotating the rear wheels in response to energy supplied by the rider; front wheel support members connecting the front wheels to the front end of the frame for pivotal movement in order to steer the cart; and a steering mechanism for steering the front wheels, including a steering lever pivotally mounted to the frame and having control members located to be engaged by the feet of the rider, and steering rods connected between the steering lever and the front wheel support members for pivoting the front wheels in response to pivoting movement of the steering lever.

3 Claims, 1 Drawing Sheet

HAND PROPELLED AND FOOT STEERED CART

BACKGROUND OF THE INVENTION

The present invention relates to non-motorized vehicles, particularly for use by children.

Vehicles for use by children customarily have two or three wheels. It is very difficult for small children to learn to operate a two wheeled vehicle, and three wheeled vehicles have been found, in practice, to be somewhat unsafe; if the rider should travel over an uneven surface or attempt to turn too sharply, there is a tendency for such a vehicle to tip over.

Typically, the front wheel of a child's tricycle is associated with foot pedals which are located to either side of the wheel and when the front wheel is turned for steering purposes, the rider's feet must assume awkward positions in order to remain in contact with the pedals while avoiding contact with the front wheel itself. If the vehicle should tip over, the rider's feet will impact the ground, and injury is likely.

U.S. Pat. No. 4,524,987 describes a hand-powered tricycle having a front wheel which is steered by means of the rider's feet and two levers arranged to be gripped by the rider's hands, to be moved in a reciprocating fashion, and linked to the rear wheels of the vehicle to rotate the rear wheels and thus propel the vehicle.

SUMMARY OF THE INVENTION

It is an object of this invention to provide an improved vehicle of this type having improved stability.

Another object of the invention is to provide an improved vehicle which can be propelled efficiently.

A further object of the invention is to provide a vehicle having simple and durable propelling and steering mechanisms.

The above and other objects are achieved, according to the invention, by a non-motorized cart for carrying a rider who supplies propelling energy for the cart, comprising:

a frame having an H-shaped form, a front end and a rear end;

two front wheels and two rear wheels;

propelling means including a crank mechanism connected to the rear wheels for rotating the rear wheels in response to energy supplied by the rider;

front wheel support means connecting the front wheels to the front end of the frame for pivotal movement in order to steer the cart;

and steering means for steering the front wheels, the steering means comprising a steering lever pivotally mounted to the frame and having control members located to be engaged by the feet of the rider, and steering rods connected between the steering lever and the front wheel support means for pivoting the front wheels in response to pivoting movement of the steering lever.

Furthermore, in embodiments of the invention, the frame is constructed to support a seat which is close to the ground so that a rider and cart will have a low profile and a low center of gravity. For this purpose, the frame is relatively long so that the foot pedals can be engaged with the rider's legs extending close to the horizontal.

In further accordance with the invention, the steering pedals are spaced inwardly of the front wheels so that the rider's feet remain inboard of the vehicle and spaced from the front wheels.

DESCRIPTION OF THE PREFERRED EMBODIMENTS

Figure 1:
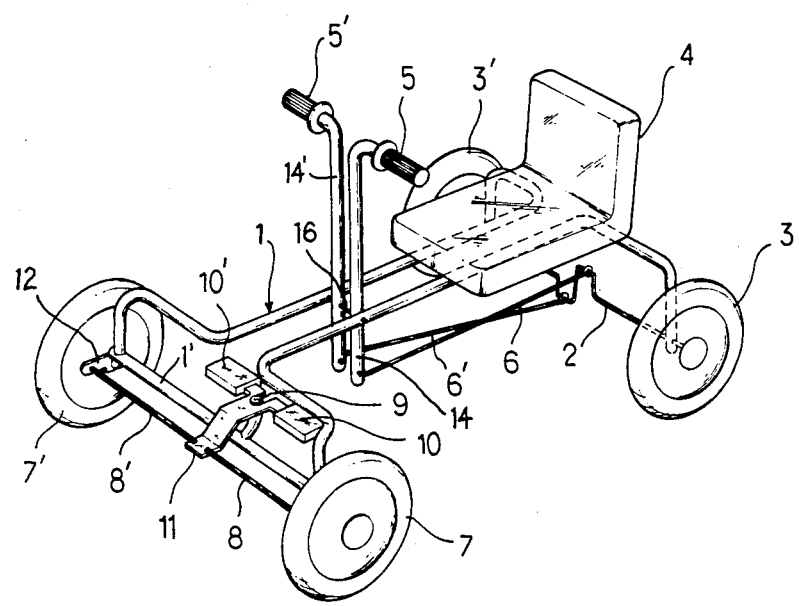
FIG. 1 is a perspective view of a preferred embodiment of a cart according to the invention.
Figure 2:
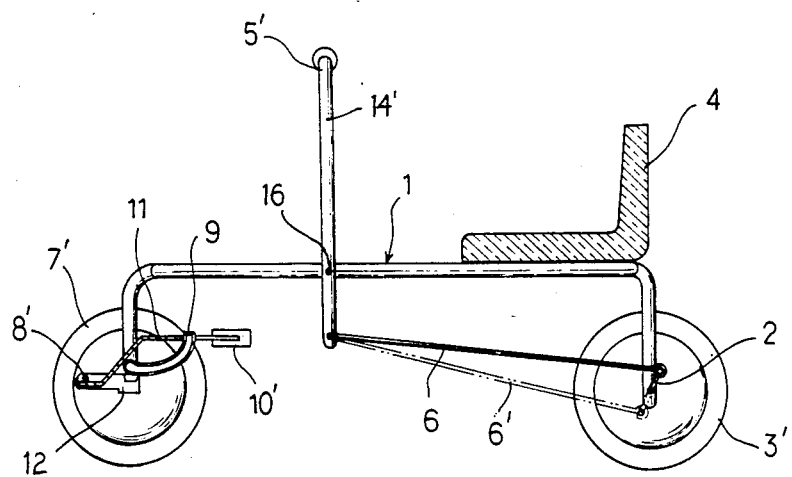
FIG. 2 is a side cross-sectional view through the median plane of the cart of FIG. 1.

The cart shown in FIGS. 1 and 2 is composed of an H-frame 1 consisting of two tubular essentially longitudinal pieces and a tubular front crossbar 1'. Frame 1 carries a seat 4. The cart is provided with two rear wheels 3 and 3' and two front wheels 7 and 7'.

Rear wheels 3 and 3' are fixed to an axle 2 which is rotatably mounted in bearings or bores carried by frame 1.

Crossbar 1' is rigidly fixed to the two tubular pieces of frame 1 and is provided at each end with a respective bracket 12, only one of which is visible in the Figures. Each bracket 12 is supported by crossbar 1' to be pivotable about a vertical axis and each of wheels 7 and 7' is rotatably mounted to a respective one of brackets 12.

Each bracket 12 extends forwardly of its pivot connection to crossbar 1' and is connected by a respective steering rod 8 or 8' to a steering lever 11, each rod 8, 8' being articulated to its associated bracket 12 and to lever 11.

Lever 11 is pivotally mounted on a pin 9 fixed to crossbar 1' and carries two foot pedals 10 and 10'. A user sitting on seat 4 can thus steer the cart by pressing with their feet on one or the other of pedals 10 and 10' to suitably pivot lever 11 and move rods 8 and 8' transversely to the length of the cart.

For propelling the cart, there are provided two-armed levers 14 and 14' pivoted to the tubular pieces of frame 1 via a pivot pin 16. Each lever 14, 14' has a long arm extending upwardly from pivot pin 16 and ending in a handlebar 5 or 5' and a short arm extending downwardly from pivot pin 16 and articulated to one end of a respective drive rod 6 or 6'.

Axle 2 is formed to have two crank portions which extend in respective diametrically opposite directions from the axis of rotation of axle 2. Each of rods 6 and 6' is rotatably connected to a respective crank portion.

To propel the cart, the user grasps handlebars 5 and 5' and moves them alternately forward and back, the direction of movement of one handlebar always being opposite to that of the other handlebar. This moves rods 6 and 6' in respectively opposite directions, imparting a rotary movement to the crank portions of axle 2 and hence to rear wheels 3 and 3'.

The cart can be propelled in either direction, depending on the direction in which each handlebar 5, 5' is initially moved.

Seat 4 can be secured to the tubular pieces of frame 1 by screws, nuts and bolts, or other removable fastening means. The tubular pieces can be provided with a series of fastening holes, permitting the position of seat 4 to be adjusted to the size of the user and to be changed as the user grows.

The upwardly extending arms of levers 14, 14' are longer than the downwardly extending arms, so that the force transmitted to rods 6, 6' will be greater than that applied to handlebars 5, 5'.

Even during turning of the vehicle, the rider's feet can retain their normal orientation, i.e. the ankles need not be bent into awkward and uncomfortable positions.

The four-wheel vehicle according to the present invention is stable in operation, i.e. relatively secure against tipping over. Even if it should tip over during a sharp turn, the rider's feed would be protected from the ground by the front wheels, which are outboard of the foot pedals.

The steering mechanism is such that the angle through which the front wheels can be turned is limited. Therefore, sharp turns, with the attendant possibility of tipping over, are prevented.

The lower arm of each lever 14, 14' could, if desired, be provided with a series of holes spaced apart along the length of the lever arm for receiving the cooperating end of the associated rod 6, 6'. In this way, the force which must be applied to handlebars 5, 5' to propel the vehicle can be adjusted to the individual rider.

Preferably, the cart is given a length such that the rider's legs will assume an essentially horizontal orientation. As a result, frame 1 and seat 4 can be built to be close to the ground, so that the cart and the rider will have a low, and hence stable, center of gravity.

It will be understood that the above description of the present invention is susceptible to various modifications, changes and adaptations, and the same are intended to be comprehended within the meaning and range of equivalents of the appended claims.

The present disclosure relates to the subject matter disclosed in Korean application No. 17183/85 of Dec. 20th, 1985, the entire specification of which is incorporated herein by reference.

What is claimed is:

1. A non-motorized cart for carrying a rider along a surface, said rider supplying propelling energy for the cart, comprising:
 a frame including
  first and second spaced coplanar longitudinally extended members;
  a front pair and a rear pair of supporting frame members, each pair extending in opposite transverse directions from respective ends of said longitudinally extended members, being curved on an outer transverse portion thereof, and extending downwardly to lower ends; and
  a front crossbar affixed to the lower ends of said front pair of supporting frame members, said front crossbar extending in said transverse direction and being parallel to the plane of said longitudinally extended members said crossbar including a central, upwardly extending pivot bracket;
 a seat mounted on said longitudinally extended members;
 propelling means comprising
  first and second propelling levers pivotally connected to said first and second longitudinally extended members, each of said propelling levers having an upwardly extending arm and a downwardly extending arm;
  a rear axle rotatably mounted at the lower ends of said rear pair of supporting frame members, said rear axle having first and second crank portions extending in diametrically opposite directions from the axis of rotation of said rear axle;
  first and second connecting rods connecting the downwardly extending arms of said first and second propelling levers to the first and second crank portions of said rear axle respectively; and
  a pair of rear wheels adpated for contacting said surface, one of said rear wheels being mounted at each end of said rear axle; and
 steering means comprising
  a pair of brackets, each of said brackets being pivotably connected to a respective end of said front crossbar for rotation about an axis perpendicular to the plane of said longitudinally extended members;
  steering rod means having ends thereof attached to said brackets;
  a pair of front wheels adapted for contacting said surface, one of said front wheels being rotatably mounted on each of said brackets; and
  a lever attached to said steering rod means and pivotally connected to said front crossbar pivot bracket, said lever being provided with pedal means interposed between said front wheels at a height above said surface which is greater than the radius of said front wheels and less than their diameter for displacing the wheels of said cart through a limited angle by rotating said lever about said pivot.

2. A cart as defined in claim 1 wherein said pedal means comprises foot pedals.

3. A cart as defined in claim 1 wherein said upwardly extending arms of said propelling levers are longer than the downwardly extending arms thereof.

* * * * *